United States Patent
Zou et al.

(10) Patent No.: US 9,823,933 B2
(45) Date of Patent: Nov. 21, 2017

(54) SYSTEM AND METHOD OF REISSUE PARKING FOR A MICROPROCESSOR

(71) Applicant: VIA ALLIANCE SEMICONDUCTOR CO., LTD., Shanghai (CN)

(72) Inventors: Penghao Zou, Beijing (CN); Mengchen Yang, Beijing (CN); Jianbin Wang, Beijing (CN); Xiaoyuan Yu, Beijing (CN); Xin Yu Gao, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 491 days.

(21) Appl. No.: 14/659,372

(22) Filed: Mar. 16, 2015

(65) Prior Publication Data

US 2016/0266906 A1 Sep. 15, 2016

(30) Foreign Application Priority Data

Mar. 9, 2015 (CN) .......................... 2015 1 0101450

(51) Int. Cl.
*G06F 9/30* (2006.01)
*G06F 9/38* (2006.01)

(52) U.S. Cl.
CPC .......... *G06F 9/3855* (2013.01); *G06F 9/3836* (2013.01)

(58) Field of Classification Search
CPC ..... G06F 9/3855; G06F 9/3836; G06F 9/3838
See application file for complete search history.

(56) References Cited

U.S. PATENT DOCUMENTS

| | | | | |
|---|---|---|---|---|
| 6,240,509 B1 * | 5/2001 | Akkary | ................ | G06F 9/3842 711/207 |
| 6,542,984 B1 * | 4/2003 | Keller | ................... | G06F 9/3838 712/214 |
| 2003/0149862 A1 * | 8/2003 | Kadambi | .............. | G06F 9/3838 712/217 |

* cited by examiner

*Primary Examiner* — Corey S Faherty
(74) *Attorney, Agent, or Firm* — McClure, Qualey & Rodak, LLP

(57) ABSTRACT

A reissue instruction parking system for a microprocessor including a reservation stations module that dispatches instructions for execution and a reorder buffer that reissues instructions to the reservation stations module during a reissue state, in which the reissue instruction parking system includes at least one first pipeline stage and at least one second pipeline stage, in which the first pipeline stages provide a first reissue instruction from a reissue data path to the reservation stations module during the reissue state and that parks the first reissue instruction once the reservation stations module is determined to be full, and in which the second pipeline stages select a pointer to the reorder buffer which provides a corresponding first reissue instruction onto the reissue data path, in which the second pipeline stages are placed into a hold state when a second full signal is asserted.

20 Claims, 8 Drawing Sheets

SYSTEM AND METHOD OF REISSUE PARKING FOR A MICROPROCESSOR

BACKGROUND OF THE INVENTION

Field of the Invention

The present invention relates in general to reissuing instructions in a microprocessor, and more particularly to a system and method of reissue parking to avoid inefficiencies associated with re-reissuing instructions.

Description of the Related Art

Many modern microprocessors are superscalar in which they include multiple execution units and are capable of issuing multiple instructions to the execution units in a single clock cycle. Many modern microprocessors also perform out-of-order execution. That is, the microprocessor may execute instructions out of the order specified by the program that includes the instructions. Superscalar out-of-order execution microprocessors typically attempt to maintain a relatively large pool of outstanding instructions so that they can take advantage of a larger amount of instruction parallelism.

The microprocessor executes the instructions of an instruction set architecture, such as the x86 instruction set architecture or the like. In many such microprocessors, the instructions of the instruction set architecture, often referred to as macroinstructions, are first translated into microinstructions (or micro-operations or "μops") that are issued to a reservation stations module that dispatches the instructions to the execution units. The microinstructions are more generally referred to herein simply as the instructions. The instructions are also issued to a reorder buffer which ensures in-order retirement of the instructions.

The reservation stations module includes one or more queues and if any queue is full, the reservation stations module is unable to receive any of the instructions being issued. In a re-issue configuration, the microprocessor reverted to a reissue mode in which the rejected instructions had to be reissued from the reorder buffer. If the reservation stations module was still full, then the instructions had to be re-reissued again. During the re-reissue process, the instructions repeatedly circulated in the reissue pipeline path until the reservation stations module was not full, at which time the instructions could finally be submitted to the reservation station module to be ultimately dispatched for execution.

The re-reissue process was disadvantageous for various reasons. The determination of whether the reservation stations module was full occurred at one stage in the pipeline, and if full, the reissued instructions had to traverse multiple pipeline stages before being re-reissued again to the reservation stations module. In this manner, the re-reissue process caused delay and reduced performance of the microprocessor.

SUMMARY OF THE INVENTION

A reissue instruction parking system for a microprocessor is described herein, in which the microprocessor includes a reservation stations module that dispatches instructions for execution and a reorder buffer that reissues instructions to the reservation stations module during a reissue state. The reissue instruction parking system includes at least one first pipeline stage and at least one second pipeline stage. The at least one first pipeline stage provides a first reissue instruction from a reissue data path to the reservation stations module during the reissue state, and parks the first reissue instruction when a first full signal is asserted, in which the first full signal is asserted once the reservation stations module is determined to be full during the reissue state. The at least one second pipeline stage provides a pointer selected by the reorder buffer to the reorder buffer, in which the reorder buffer provides the first reissue instruction corresponding to the selected pointer onto the reissue data path, in which at least one second pipeline stage is placed into a hold state when a second full signal is asserted.

A microprocessor according to one embodiment includes at least one execution unit, a reservations station module that dispatches instructions for execution by the at least one execution unit, a reorder buffer that reissues instructions to the reservation stations module during a reissue state, and a reissue instruction parking system as described herein.

A method of parking reissue instructions is described herein for a microprocessor that includes a reservation stations module and a reorder buffer. The reservation stations module dispatches instructions for execution and the reorder buffer reissues instructions to the reservation stations module during a reissue state. The method may include providing a first reissue instruction from the reorder buffer to the reservation stations module, detecting a full condition of the reservation stations module and providing a first full signal, registering the first full signal and providing a second full signal, and parking the first reissue instruction when the first full signal is asserted. And while the second full signal is asserted, the method may include holding a state of a pipeline associated with the reorder buffer that provides the first reissue instruction to the reservation stations module.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the inefficiencies associated with re-reissuing instructions to a reservation stations module from a reorder buffer. They therefore developed a system and method for reissue parking that avoids instructions having to re-traverse the stages of a multistage pipeline. Instead, when the reservation station module is full, one or more instructions that have been reissued are effectively parked at the entry of the reservation stations module until it has room to receive the instruction(s).

Figure 1:
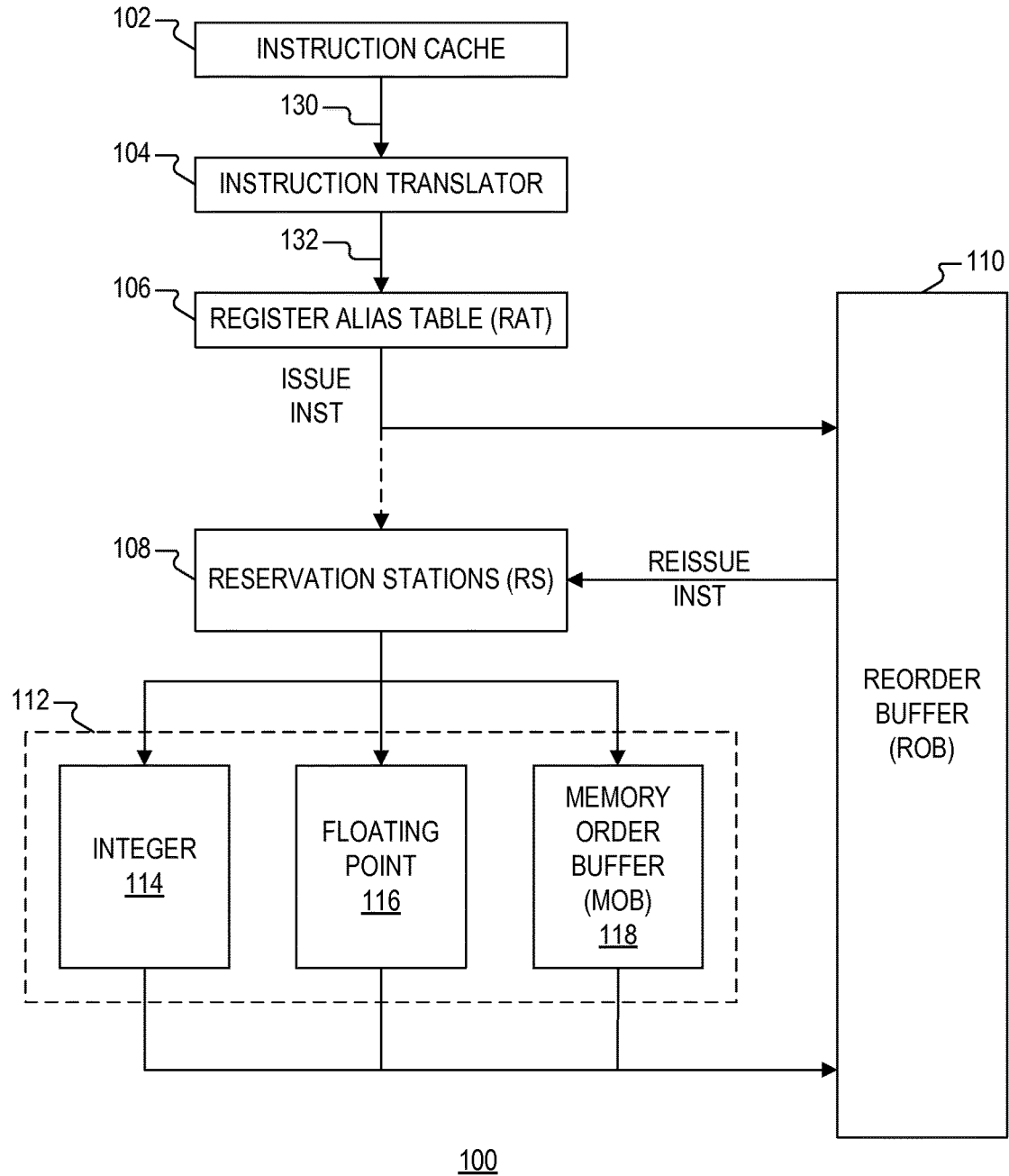
FIG. 1 is a simplified block diagram of a superscalar, pipelined microprocessor implemented according to one embodiment of the present invention.

FIG. 1 is a simplified block diagram of a superscalar, pipelined microprocessor 100 implemented according to one embodiment of the present invention. The microprocessor 100 includes an instruction cache 102 that caches macroinstructions 130 of an instruction set architecture, such as the x86 instruction set architecture or the like. Additional or alternative instruction set architectures are contemplated. The microprocessor 100 includes an instruction translator 104 that receives and translates the macroinstructions 130 into microinstructions 132. The microinstructions 132 are then provided to a register alias table (RAT) 106, which generates microinstruction dependencies and issues the microinstructions 132 in program order to a reservation stations module 108 and to a reorder buffer (ROB) 110. The reservation stations module 108 module dispatches the microinstructions to an appropriate one of multiple execution units 112. The execution units 112 may include an integer execution unit 114, such as an integer arithmetic/logic unit (ALU) or the like, a floating point execution unit 116 including a single-instruction-multiple-data (SIMD) execution unit such as MMX and SSE units or the like, and a memory order buffer (MOB) 118. The execution units 112 provide their results to the ROB 110, which ensures in-order retirement of instructions.

The microinstructions issued from the RAT 106 (ISSUE INST) may typically be referred to as microinstructions, but are more generally referred to herein simply as "instructions." In the illustrated embodiment, the RAT 106 issues up to 3 instructions at a time (e.g., per clock cycle). Although the execution units 112 are shown including only one integer execution unit 114 and one floating point execution unit 116, it is understood that any number of integer execution units and floating point execution units may be included as understood by those skilled in the art. The MOB 118 generally handles memory type instructions, such as including load and store instruction execution pipes (not shown) or the like. In one embodiment, the reservation stations module 108 is configured in a distributed manner including multiple RS queues (not shown), in which each queue dispatches one or more instructions to corresponding execution units 112.

In the illustrated configuration, when any one (or more) of the RS queues within the reservation stations module 108 is full, then the reservation stations module 108 is considered full and unable to receive additional instructions. The ROB 110 stores an entry for every instruction issued from the RAT 106. The issued instructions which failed to initially enter the reservation stations module 108 are reissued by the ROB 110, shown as REISSUE INST, to the reservation stations module 108 at a later time when no longer full. As described further herein, the ROB 110 generates and uses a reissue pointer for each instruction (or set of instructions) in the ROB 110 that did not enter the reservation stations module 108 and that is reissued from the ROB 110.

Figure 2:
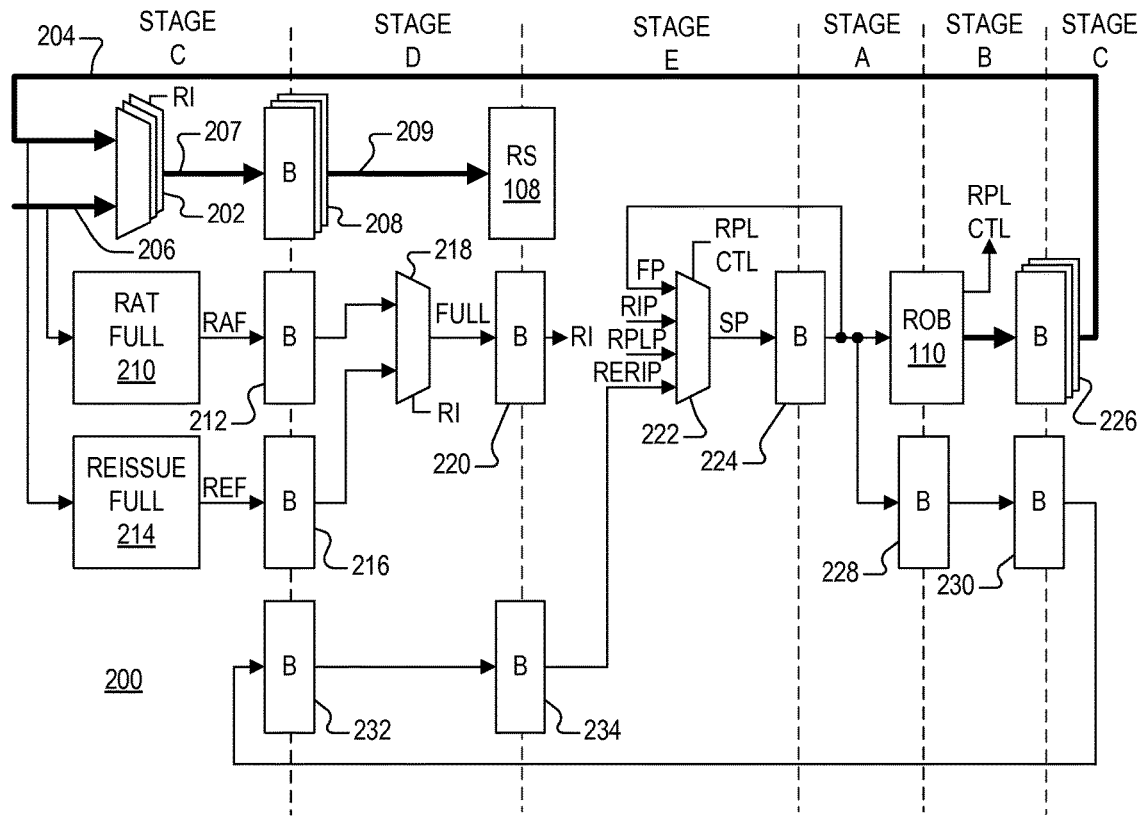
FIG. 2 is a simplified schematic and block diagram of a pipeline between the reservation stations module and the ROB of FIG. 1 according to a re-issue configuration.

FIG. 2 is a simplified schematic and block diagram of a pipeline 200 between the reservation stations module 108 and the ROB 110 according to a re-issue configuration. The pipeline 200 includes 5 sequential stages, shown as stages A, B, C, D and E, which are separated by registers. Each register or register set is denoted with an "R" and is implemented as one or more synchronous registers or the like controlled by a common synchronizing clock signal (not shown). In one embodiment, each register includes a latch (e.g., SR latch) or a flip-flop or the like for each bit of corresponding information, in which the registers have different sizes depending upon the number of bits being conveyed. As defined herein, each register performs the functions of "registering," which means synchronously transferring data or information from one stage to the next of a pipeline by latching one or more bits upon a clock edge. The C and D stages are shown on the left and are part of the reservation station (RS) hierarchy associated with the reservation stations module 108, followed by the E, A and B stages which are part of the ROB hierarchy associated with the ROB 110. The C stage bridges the reservation stations and the ROB hierarchies together. The data paths conveying the instructions are shown using bold lines to distinguish from regular (non-bold) lines for associated control signals. Certain components are shown in duplicate to indicate multiple sets of similar type data. For example, registers and multiplexers in the data path are shown in duplicate to indicate processing of multiple instructions. In one embodiment, for example, the RAT 106 may issue up to 3 instructions at a time processed collectively through the data paths.

Within the C stage, a primary multiplexer (MUX) 202 selects between REISSUE instructions from the ROB 110 via a reissue data path 204 and new instructions from the RAT 106 (not shown in FIG. 2) via path 206 based on a reissue control signal RI. Each MUX described herein performs select functions between different data signals or data sets, where it is understood that other types of select logic may be used. The selected instructions are provided to the inputs of a primary register 208 via a data path 207, having its outputs coupled to corresponding inputs of the reservation stations module 108 via a primary data path 209. The primary register 208 is part of the synchronous interface between the C and D stages. Although not shown in FIG. 2 but as previously described, the instructions issued from the RAT 106 are also provided to inputs of the ROB 110 which stores an entry for each instruction issued from the RAT 106.

The reservation stations module 108 incorporates multiple queues, and if any one or more of the queues are full, the reservation stations module 108 rejects the instructions from the primary register 208. A first full logic module 210 asserts a full signal RAF to a register 212 when instructions from the RAT 106 are rejected by the reservation stations module 108, and a second full logic module 214 asserts a full signal REF to a register 216 when reissued instructions from the ROB 110 are rejected by the reservation stations module 108. The registers 212 and 216 are aligned with the primary register 208 as part of the synchronous interface between the C and D stages, and have outputs providing the respective full signals to corresponding inputs of a full MUX 218 within the D stage controlled by a reissue control signal RI. The full MUX 218 outputs a control signal FULL which is provided to the input of a register 220, which outputs the RI control signal. It should be noted that only one set of the complete full circuit (including the full logic modules 210 and 214, the registers 212 and 216, and the full MUX 218) is shown in FIG. 2. In one embodiment, the reservation stations module 108 incorporates multiple RS queues, for example N queues. Thus there may be N full circuit sets, each including corresponding full logic modules 210 and 214, registers 212 and 216, and full MUX 218. The N sets of full circuit output N FULL signals from the N full MUXes 218 to an OR logic (not shown) to produce the RI control signal. The RI control signal is asserted high when the reservation stations module 108 is full (e.g., any one of the N RS queues is full) indicating a reissue mode of operation. The register 220 is part of a synchronous interface between the D and E stages.

In another embodiment, the full MUX 218 may be moved to the C stage instead of in the D stage as shown, in which the full MUX 218 instead receives the RAF and REF control signals. In this case, one of the registers 212 and 216 provided for alignment between the C and D stages may be omitted, and the remaining register (e.g., register 212) has its input coupled to the output of the full MUX 218 and has its output providing the FULL signal to the input of the register 220.

A pointer select MUX 222 is provided within the E stage and controlled by the ROB 110 via control signals RPL CTL. Generally, the ROB 110 tracks pointers or tags associated with each instruction (or group of instructions) and maintains the pointers in each of the reissue stages. Thus, when RI is asserted by the register 220, the ROB 110 knows the pointer of the corresponding instruction(s) which caused FULL to be asserted (by MUX 218) and uses that same pointer as a reissue pointer. The pointer select MUX 222 selects from among a feedback pointer FP, a reissue pointer RIP, a replay pointer RPLP, and a re-reissue pointer RERIP based on the RPL CTL signals and outputs a selected pointer SP to inputs of a pointer register 224 at the synchronous interface between the E and A stages. The pointer register 224 synchronously outputs the selected pointer SP to the ROB 110, which outputs the corresponding REISSUE instructions to a reissue register 226 at the synchronous interface between the B and C stages. The register 226 outputs the REISSUE instruction(s) to the primary MUX 202 of the C stage via the reissue data path 204.

The replay pointer RPLP is associated with an instruction that was previously dispatched by the reservation stations module 108 to the execution units 112 but was unable to complete for any of a variety of reasons. For example, the reservation stations module 108 may dispatch instructions out of order, in which one or more operands of the instruction may not be provided when needed during execution. An instruction that is unable to complete may be replayed, which is distinct from instructions that are reissued. Replay operation is not discussed further.

The selected pointer SP at the output of the pointer register 224 is also synchronized through re-reissue registers 228, 230, 232 and 234 at the synchronous interfaces between the A/B stages, the B/C stages, the C/D stages and the D/E stages, respectively, to provide the re-reissue pointer RERIP to the pointer select MUX 222.

Figure 3:
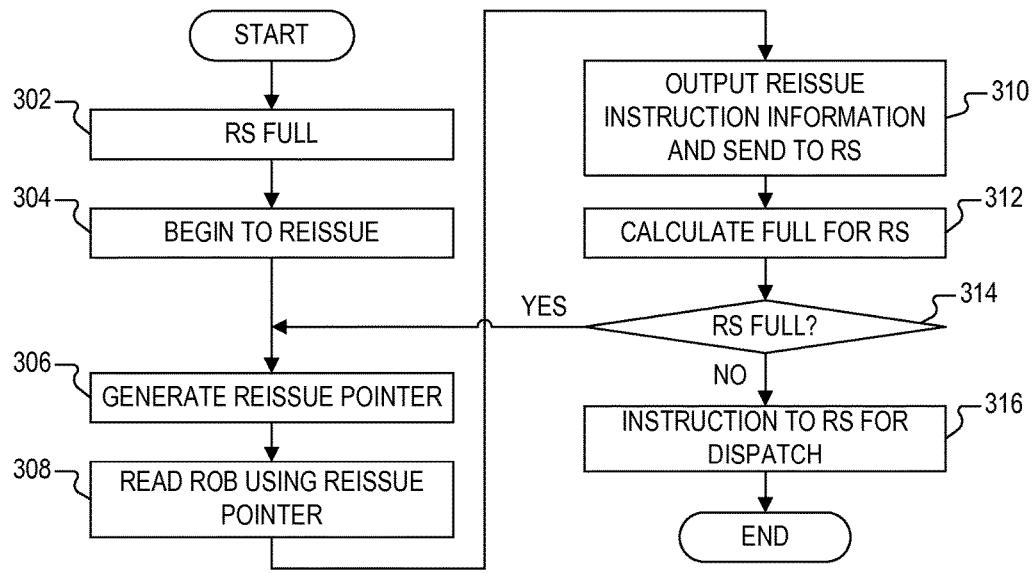
FIG. 3 is a flowchart diagram illustrating operation of the pipeline of FIG. 2 for the reissue and re-reissue processes.

FIG. 3 is a flowchart diagram illustrating operation of the pipeline 200 for the reissue and re-reissue processes. At a first block 302, instructions from the RAT 106 via path 206 attempt to enter the reservation stations module 108 when it is full. At next block 304, the rejected instructions begin the reissue state and the reissue signal RI is asserted. At next block 306, the reissue pointer is generated by the ROB 110 and provided to the pointer select MUX 222. At next block 308, the reissue pointer is presented to the ROB 110 and the corresponding reissue instructions are read out from the ROB 110. At next block 310, the reissued instructions are provided via the register 226 along the reissue data path 204 back to the primary MUX 202 and then to the primary register 208 to be presented again to the reservation stations module 108 via the primary data path 209. At next block 312, the full determination is made again for each queue of the reservation stations module 108. At next block 314, it is queried whether the reservation stations module 108 is still full. If so, operation loops back to block 306 to once again generate a reissue pointer, except that in this case it is the re-reissue pointer for a re-reissue process. Operation loops in this manner, along with the corresponding re-reissued instructions, until the reservation stations module 108 is no longer full as determined at block 314, in which case the instructions enter the reservation stations module 108 at block 316 for dispatch to the execution units 112. In this manner, according to the re-reissue process, instructions circulate the reissue data path 204 until the reservation stations module 108 is not full, at which time the instructions may finally enter the reservation stations module 108 to be ultimately dispatched for execution.

The re-reissue process is disadvantageous for various reasons. The determination of whether the reservation stations module 108 is full occurs at the D stage, and if full, the reissued instructions must traverse the 5 stages of the reissue pipeline again before being re-reissued to the reservation stations module 108. In this manner, the re-reissue process causes delay and reduces performance of the microprocessor 100.

Figure 4:
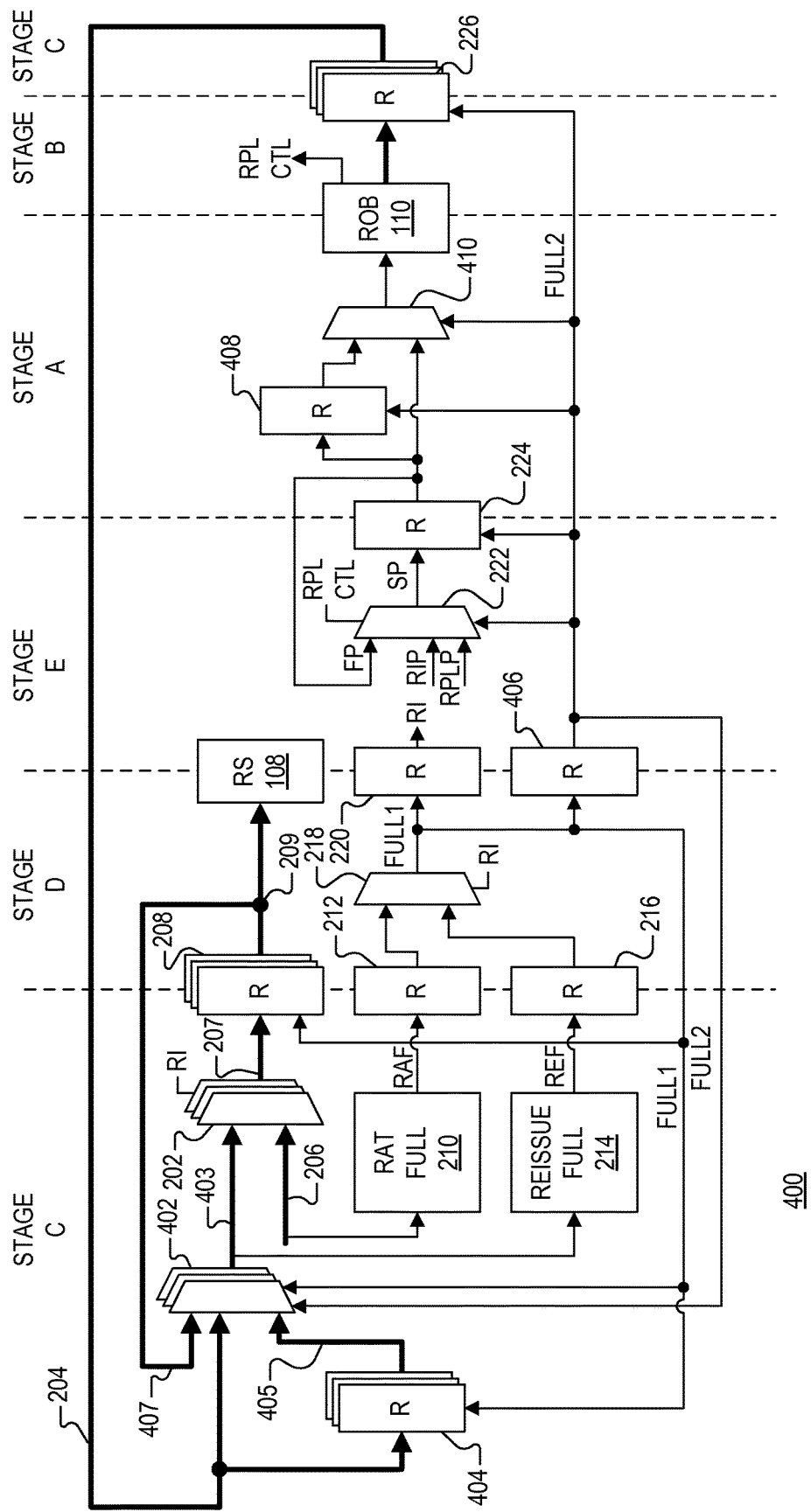
FIG. 4 is a simplified schematic and block diagram of a pipeline between the reservation stations module and the ROB of FIG. 1 according to one embodiment of the present invention.

FIG. 4 is a simplified schematic and block diagram of a pipeline 400 between the reservation stations module 108 and the ROB 110 according to another embodiment of reissue parking of the present invention. The pipeline 400 includes similar features as the pipeline 200 in which similar components assume identical reference numbers. The pipeline 400 also includes the 5 sequential stages A-E separated by registers for synchronizing operation in similar manner. The primary MUX 202, the full logic modules 210 and 214, the registers 208, 212 and 216, the full MUX 218, the register 220, the pointer select MUX 222, the registers 224 and 226, the reservation stations module 108, and the ROB 110 are included and coupled in similar manner forming the stages A-E. The re-reissue registers 228, 230, 232 and 234 associated with re-reissue, however, are removed. For reissue parking, the FULL1 signal at the output of the full MUX 218 is asserted when the reservation stations module 108 is determined to be full during the reissue state (for example, the pipeline 400 enters the reissue state when RI signal is asserted) at D stage. When the FULL1 signal is asserted, the reissue instruction on the primary data path 209 is parked. In one embodiment, the reissue instruction is parked in the primary register 208 by the FULL1 signal, and data associated with the calculations of the full logic module 214 are fed back to a gating reissue MUX 402 (details further discussed herein) for the full logic module 214 to determine whether the RS queue corresponding to the reissue instruction is full until it is not full. In another embodiment, all data of the reissue instruction is parked among the pipeline stages of the gating reissue MUX 402 (details further discussed herein), the primary MUX 202 and the primary register 208.

In one embodiment, because the stages E, A and B locate under the hierarchy of ROB 110 while the stages C and D locate under the hierarchy of RS 108 and there is some distance between ROB 110 module and RS 108 module on the layout, the asserted FULL1 signal at D stage might not be transmitted to the stages E, A and B to place these stages into a hold state within a single clock cycle. Thus in one embodiment, a full register 406 is added at the synchronous interface between the D and E stages to produce a latched version of the FULL1 signal, which is renamed as FULL2 signal thereafter. The FULL1 signal and the FULL2 signal are used to control the reissue parking in two clock cycles. Also, a gating register 404 is added to hold the reissue instruction piped down from the ROB 110 and register 226 to the C stage upon assertion of the FULL1 signal because the A and B stages have not been parked by the FULL2 signal yet. In some other embodiments, if the manufacture process is advanced enough to place the stages E, A and B and the stages C and D within a layout distance which the FULL1 signal could travel within a single clock cycle, the full register 406 and the gating register 404 may be removed, that is, only the FULL1 signal is enough to control the reissue parking in one clock cycle. FIG. 4 only shows an embodiment of reissue parking in which a gating reissue MUX 402 and the gating register 404 are added in stage C, and the full register 406 is also added at the synchronous interface between the D and E stages. A hold register 408 and a hold MUX 410 are added to the A stage in one embodiment in which the design of ROB 110 is not modified; in other embodiments, the hold register 408 and hold MUX 410 may also be removed.

The primary data path 209 at the output of the register 208 is extended by a feedback data path 407, which is fed back to a first input of the gating reissue MUX 402. The reissue data path 204 at the output of the register 226 is fed back to another input of the gating reissue MUX 402 and to the input of the gating register 404 rather than to the MUX 202. A gated data path 405 at the output of the gating register 404 is provided to another input of the gating reissue MUX 402, having its output providing a second reissue data path 403 to the reissue input of the primary MUX 202. The data path 206 from the RAT 106 is provided to the other input of the primary MUX 202. The FULL signal at the output of the full MUX 218 is FULL1, which is provided to the enable input of the primary register 208, to the input of the full register 406, to a control input of the gating reissue MUX 402, and to a control input of the gating register 404. The output of the full register 406 provides a second signal FULL2, which is a latched version of signal FULL1 and is provided to control inputs of the gating reissue MUX 402, the pointer select MUX 222, the registers 224, 408 and 226, and to a control input of the hold MUX 410.

In general, during normal operation when the signals FULL1, FULL2 and RI are negated, the primary MUX 202 selects data path 206 (from the output of the RAT 106) and instructions are loaded into the reservation stations module 108 when not full. The pointer select MUX 222 and the pointer register 224 operate as normal, and the hold MUX 410 selects the output of the register 224 for providing the selected pointer SP to the ROB 110. When at least one of the RS queues within the reservation stations module 108 becomes full so that the next one or more instructions from the RAT 106 would cause overflow, then the first full logic module 210 asserts the full signal RAF to the register 212, and then in the next clock cycle, RI is asserted to enter the reissue state, in which the primary MUX 202 only receives reissue instructions from ROB 110 via the second reissue data path 403 according to the asserted RI signal. During the reissue state, if the second full logic module 214 asserts a full signal REF to the register 216, then FULL1 is asserted again to park the reissue instructions. In one embodiment, FULL1 is provided to the primary register 208 to effectively park the reissue instructions at the primary register 208, and meanwhile FULL1 is asserted to the gating reissue MUX 402 to fed back data in the parked reissue instruction associated with the full calculations of the full logic module 214 via feedback path 407 to keep determining whether the RS queue corresponding to the parked reissue instruction is full until it is not full.

In another embodiment, FULL1 is only asserted to the gating reissue MUX 402 (but not to the primary register 208, that is, FULL1 is not provided to the primary register 208) to park the reissue instruction among the pipeline stages of MUXes 402 and 202 and the primary register 208, and meanwhile to feedback all data of the parked reissue instruction to keep determining whether the RS queue corresponding to the parked reissue instruction is full until it is not full. Besides, FULL1 is asserted to open the write ports of the gating register 404 to receive another set of reissue instructions from the output of the reissue register 226 because stages E, A and B of the ROB 110 have not been placed into a hold state yet. In the next clock cycle FULL2 is asserted to place stages E, A and B of the ROB 110 into a static hold state. When the reservation stations module 108 is not full, FULL1 is initially negated (while FULL2 remains asserted), in which the parked instructions enter the reservation stations module 108. The MUX 402 switches to select the output of the gating register 404 so that the instructions stored therein are latched to the primary register 208. In the next clock cycle, FULL2 is negated so that the ROB 110 stages E, A and B are released for normal reissue, and the negated FULL2 and negated FULL1 make the MUX 402 switch to select the reissue instructions from the register 226 via the reissue data path 204.

In a similar manner as noted above with respect to FIG. 2, only one set of full circuit (including the full logic modules 210 and 214, the registers 212 and 216, and the full MUX 218) is shown in FIG. 4. As previously described, the reservation stations module 108 may incorporate N RS queues so that there are N corresponding full circuit sets. The full circuit sets thus output N full signals from N full MUXes 218 to OR logic (not shown) to produce the FULL1 signal as described above, and then the OR logic outputs the FULL1 signal to the input of the register 220, which outputs the RI control signal. That is to say, if any RS queue in the reservation stations module 108 is full, it causes the reissue parking until the parked reissue instructions that caused the reissue parking successfully reissue to the corresponding RS queue. Also, in a similar manner as described for FIG. 2, in another embodiment, each full MUX 218 may be placed in stage C receiving the RAF and REF control signals providing its output to one of the registers 212 and 216 (e.g., register 212 in which register 216 is omitted), having its output providing the FULL1 signal to the input of the register 220.

Figure 7:
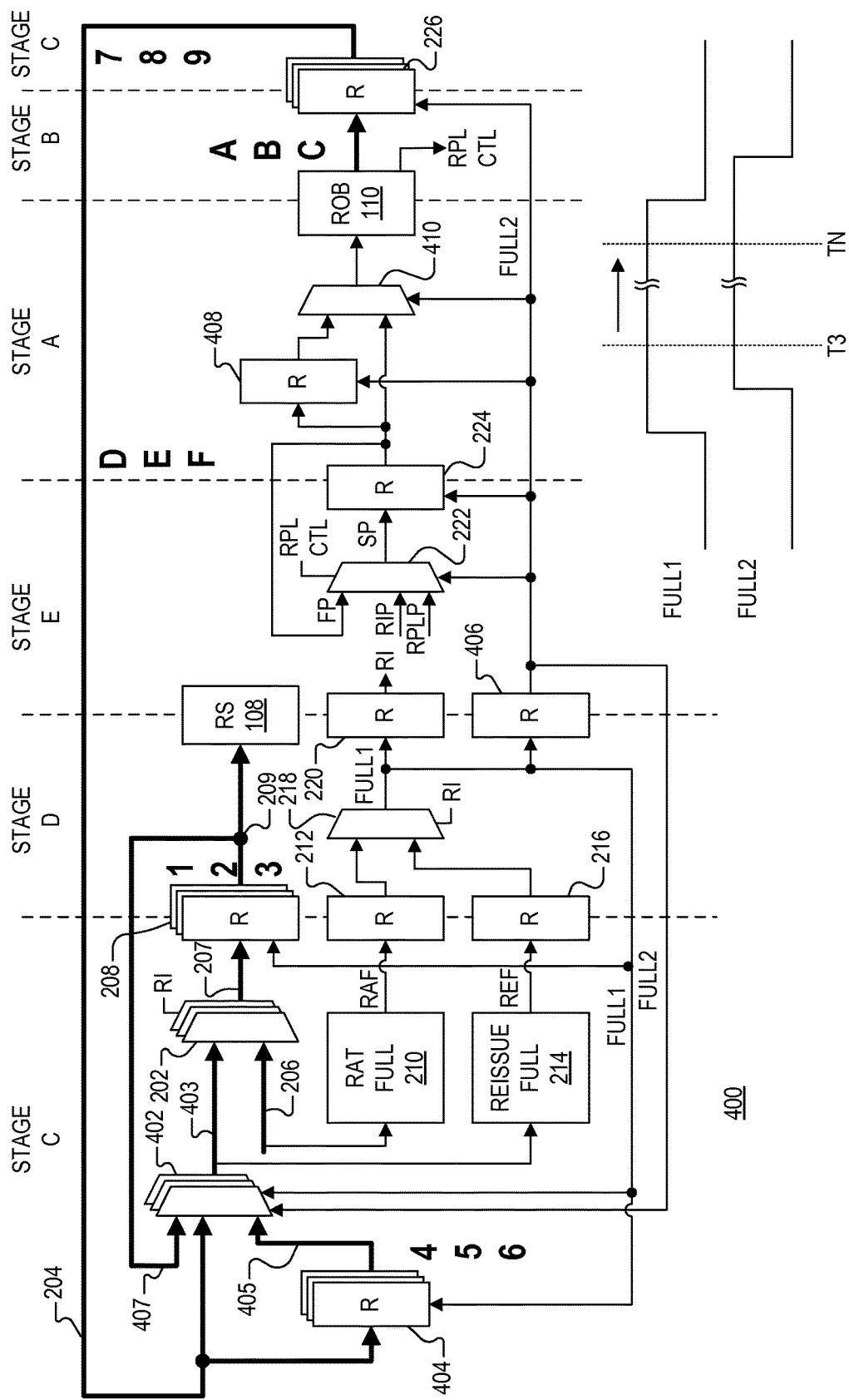
Figure 8:
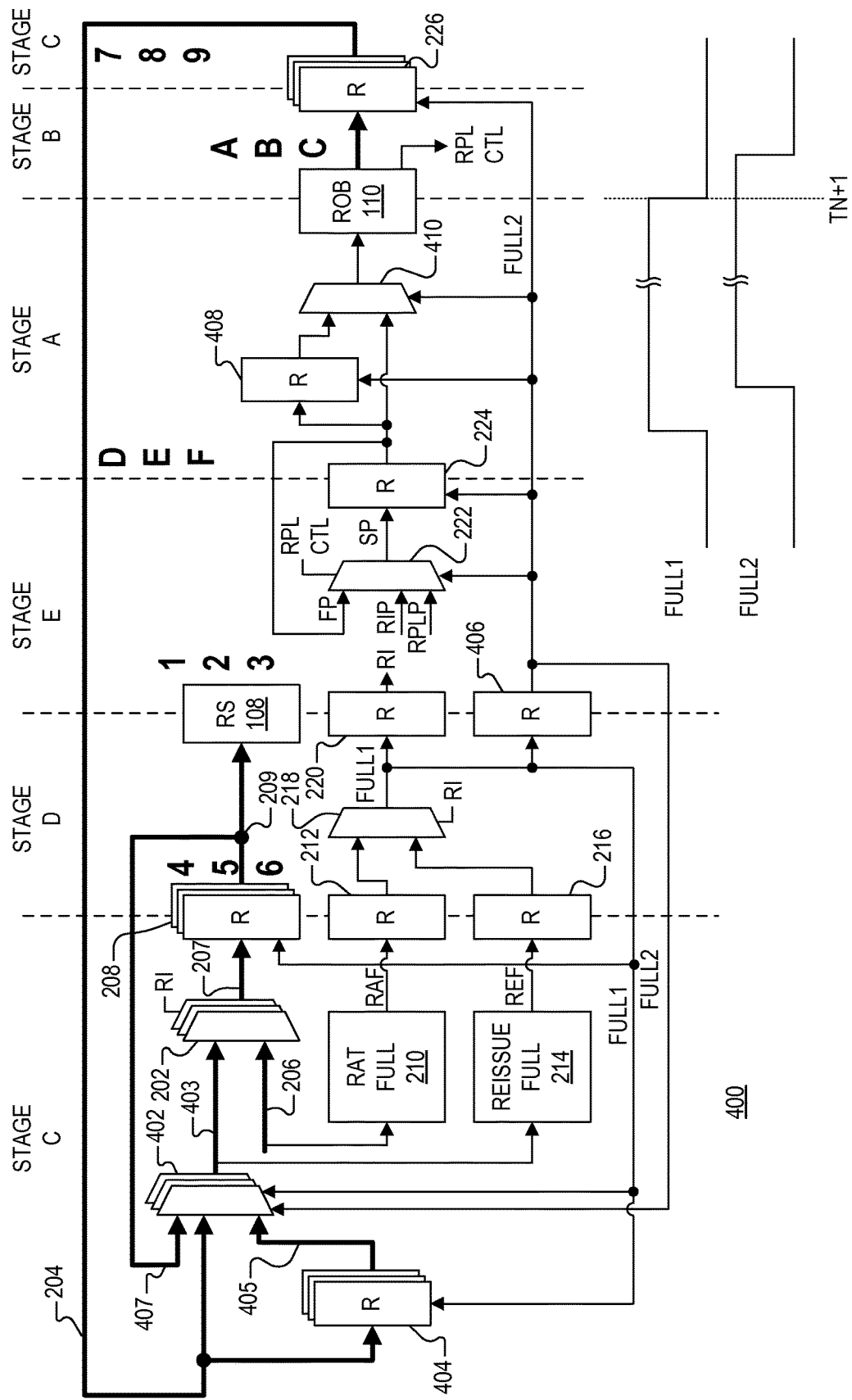

As described for FIG. 2, the pointer register 224 synchronously outputs the selected pointer SP to the ROB 110, which outputs the corresponding REISSUE instructions to a reissue register 226 at the synchronous interface between the B and C stages. During reissue parking procedure, when FULL2 is negated, the hold register 408 and the hold MUX 410 provide selected pointer SP to the ROB 110, while when FULL2 is asserted, the hold register 408 and the hold MUX 410 provide a hold pointer which is a latched version of an old selected pointer SP to the ROB 110 to read the old reissue instructions which are parked in ROB 110 (like reissue instructions A/B/C as shown in FIGS. 6, 7 and 8).

Figure 5:
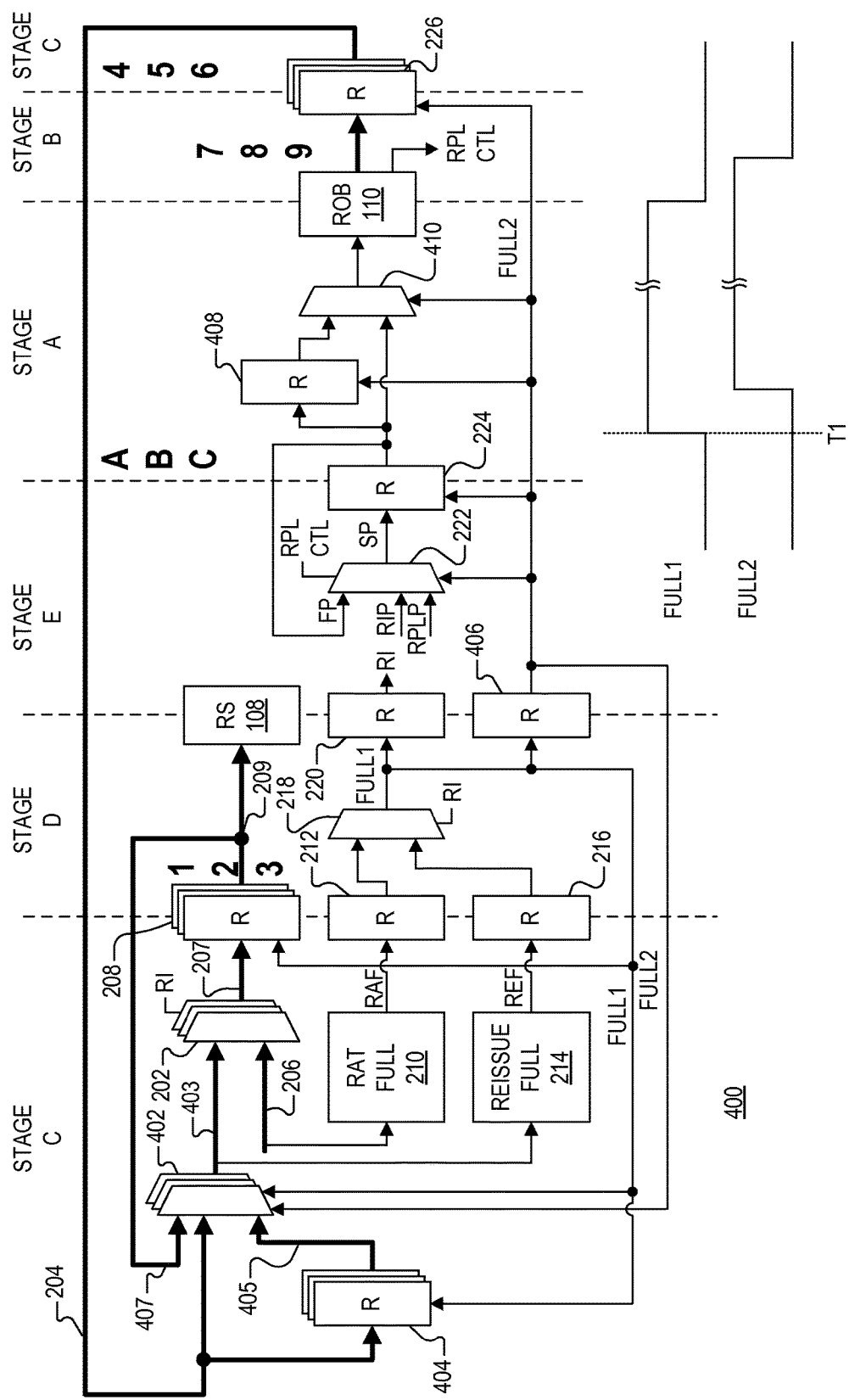
FIGS. 5-9 are diagrams of the pipeline in different states for sequential clock cycles illustrating a reissue parking procedure according to one embodiment of the present invention.

FIGS. 5, 6, 7, 8 and 9 are diagrams of the pipeline 400 in different states for sequential clock cycles illustrating a reissue parking procedure according to one embodiment of the present invention. In each diagram, a group of 3 reissue instructions are shown bolded at their respective positions in the pipeline 400. As shown in FIG. 5, for example, the pipeline 400 is processing instruction groups 1/2/3, A/B/C, 7/8/9, and 4/5/6 in stages D, A, B and C, respectively. Also shown in each diagram is a timing diagram of the signals FULL1 and FULL2 and a time value indicating the position in time for the pipeline 400. It is noted that each group generally includes up to 3 instructions for the given configuration in which only 0, 1 or 2 instructions may be included in any given group.

FIG. 5 shows the pipeline 400 at the beginning of reissue parking at a time T1 when FULL1 is first asserted. In this case, the instructions 1/2/3 are parked in the D stage (primary register 208) in which the reservation stations module 108 is full such that the instructions 1/2/3 are unable to enter. The instructions 4/5/6 are at stage C (reissue register 226), the instructions 7/8/9 are at stage B (being read out from the ROB 110), and the instructions A/B/C (or at least the pointer associated therewith) are at the A stage. As described above, when FULL1 is asserted, the gating reissue MUX 402 selects the primary path 407 (fed back from the primary register 208 via the primary data path 209), and the write ports of the gating register 404 are opened to receive the output of the reissue register 226. In one embodiment, the instructions 1/2/3 are parked in primary register 208 by the asserted FULL1, and data of the instructions 1/2/3 associated with full calculations of the reissue full logic module 214 are fed back to gating reissue MUX 402 via the feedback data path 407 and then used by the reissue full logic module 214 to determine whether the RS queue corresponding to the reissue instruction 1/2/3 is full until it is not full. In another embodiment, the FULL1 signal is not coupled to the enable input of the primary register 208, and all data of the instructions 1/2/3 are fed back to gating reissue MUX 402, and parked among the gating reissue MUX 402, MUX 202 and the primary register 208 when FULL1 is asserted.

Figure 6:
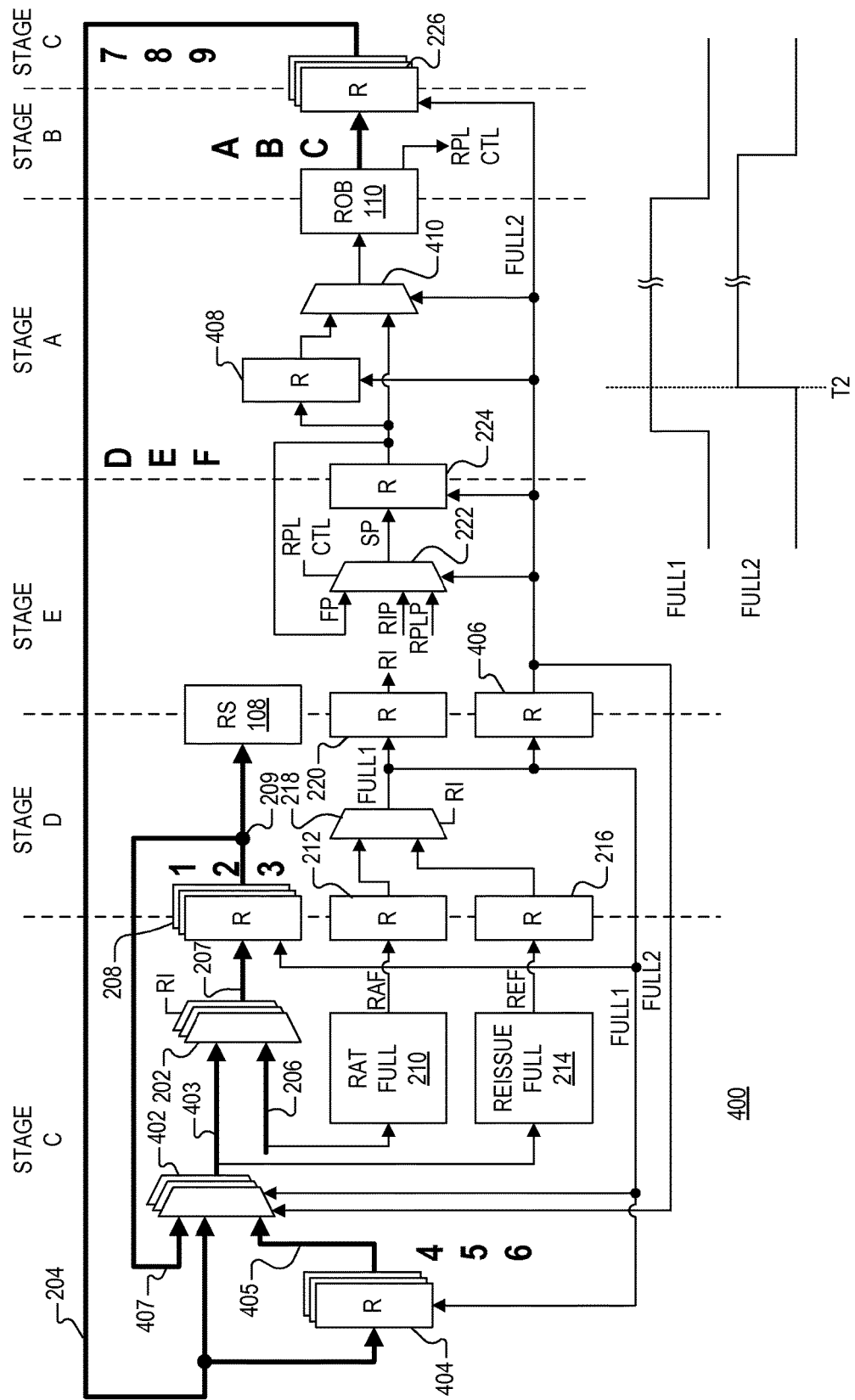

FIG. 6 shows the pipeline 400 in the next clock cycle of reissue parking at a time T2 when both FULL1 and FULL2 are asserted. The instructions 1/2/3 are parked in the D stage (primary register 208). The instructions 4/5/6 are latched into the gating register 404. The instructions 7/8/9 have been latched into the reissue register 226, and the instructions A/B/C are being read out of the ROB 110. Instructions D/E/F enter the A stage. At this point the MUXes 222 and 410 and the registers 224, 408 and 226 are in a hold state by the assertion of FULL2. The pipeline 400 has entered a reissue parked state.

As used herein, a register is in a hold state when it does not latch new data or information at its input to its output but instead holds the data currently latched. Alternatively, select logic, such as a corresponding MUX or the like, selects a feedback path so that the data at its output is fed back into its input so that the register effectively "holds" the same data during sequential clock cycles until the hold is no longer in effect.

FIG. 7 shows the pipeline 400 in the next clock cycle of reissue parking at a time T3 while both FULL1 and FULL2 remain asserted. In this case, the pipeline 400 remains in the reissue parked state so that the instructions 4/5/6, 1/2/3, D/E/F, A/B/C and 7/8/9 remain stationary and do not advance to the next stage. The pipeline 400 effectively remains stalled in the reissue parked state for so long as the reservation stations module 108 is full, shown up to a time TN corresponding with a clock cycle "N".

FIG. 8 shows the pipeline 400 in the next clock cycle at a time TN+1 when the reservation stations module 108 is no longer full and FULL1 is de-asserted low while FULL2 is still high. In this case, the instructions 1/2/3 enter the reservation stations module 108 and the gating reissue MUX 402 selects the gated data path 405 and the instructions 4/5/6 are clocked into the primary register 208 and thus into stage D. Since FULL2 is still asserted, stages E, A and B remain stalled so that instructions D/E/F, A/B/C and 7/8/9 remain at stages A, B and C, respectively.

Figure 9:
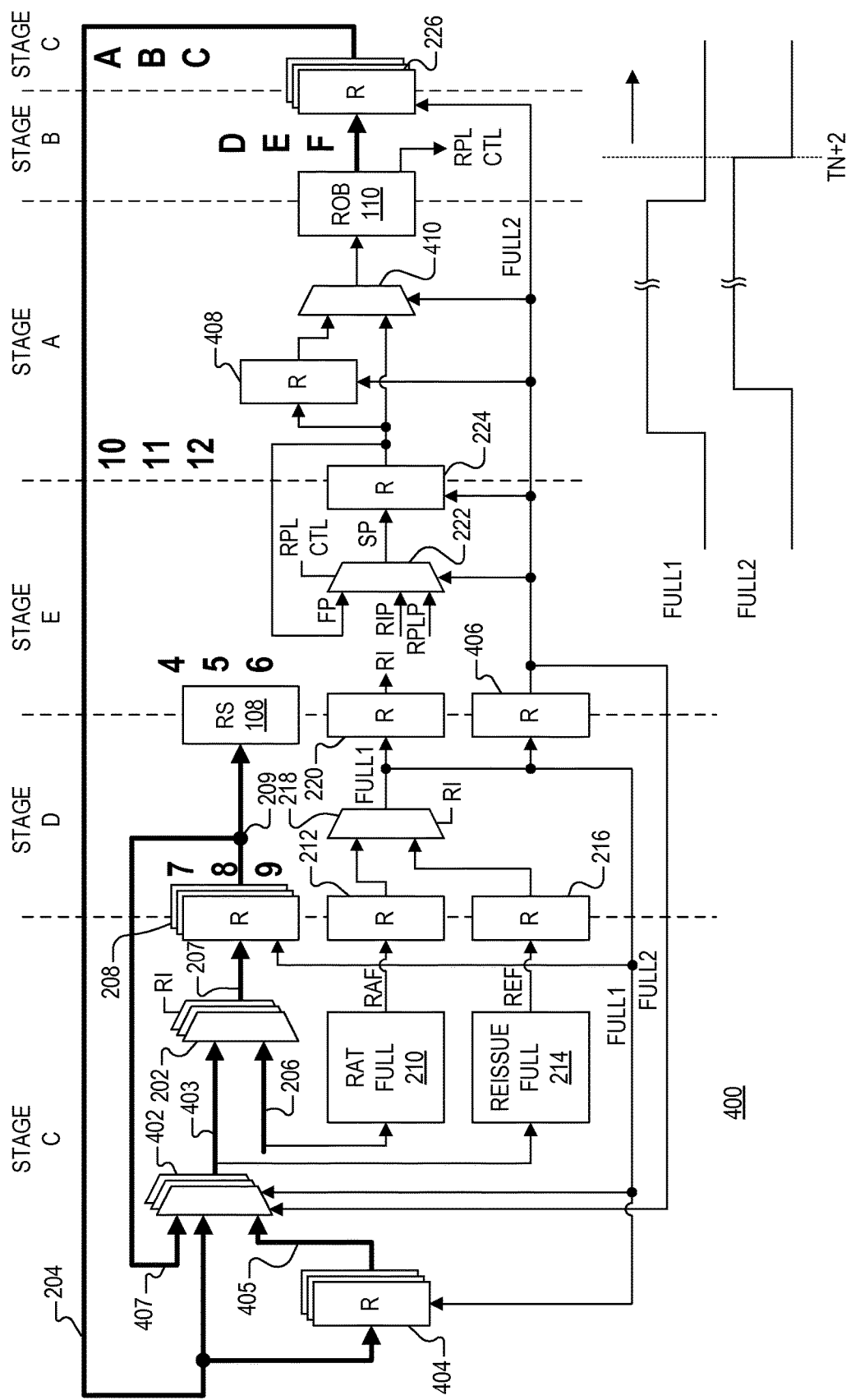

FIG. 9 shows the pipeline 400 in the next clock cycle at a time TN+2 when the reservation stations module 108 is not full, reissue parking has completed, and both FULL1 and FULL2 are de-asserted. The instructions 4/5/6 have entered the reservation stations module 108, and the gating reissue MUX 402 selects the first reissue data path 204 so that the instructions 7/8/9 are clocked into the primary register 208. The instructions A/B/C have advanced to stage C (via reissue register 226), the instructions D/E/F are being read out of the ROB 110, and instructions 10/11/12 are clocked into stage A.

Reissue parking avoids the inefficiencies of the re-reissue process. Rather than re-reissuing instruction(s) from the ROB to the reservation stations module with associated delays through the pipeline, the instructions are parked in front of the reservation stations module and the full determination continuously made until the reservation stations module is no longer full. The pipeline stages associated with the reorder buffer are placed into a hold state. When not full, the parked instructions may enter immediately without delay and the pipeline is effectively restarted within one or two clock cycles.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A reissue instruction parking system for a microprocessor, wherein the microprocessor includes a reservation stations module that dispatches instructions for execution and a reorder buffer that reissues instructions to the reservation stations module during a reissue state, said reissue instruction parking system comprising:
   at least one first pipeline stage that provides a first reissue instruction from a reissue data path to the reservation stations module during the reissue state, and that parks said first reissue instruction when a first full signal is asserted, wherein said first full signal is asserted once the reservation stations module is determined to be full during the reissue state; and
   at least one second pipeline stage that provides a pointer selected by the reorder buffer to the reorder buffer, in which the reorder buffer provides said first reissue instruction corresponding to said selected pointer onto said reissue data path, wherein said at least one second pipeline stage is placed into a hold state when a second full signal is asserted.

2. The reissue instruction parking system of claim 1, wherein said second full signal is a latched version of said first full signal.

3. The reissue instruction parking system of claim 1, wherein said at least one first pipeline stage further comprises:
   reissue parking logic that parks said first reissue instruction when said first full signal is asserted, that selects a gated second reissue instruction registered from said reissue data path when said first full signal is negated and when said second full signal is asserted, and that selects a third reissue instruction from said reissue data path when said first and second full signals are both negated.

4. The reissue instruction parking system of claim 3, wherein said reissue parking logic comprises:
   a gating register that holds a second reissue instruction from said reissue data path upon assertion of said first full signal and that outputs said gated second reissue instruction; and
   gating reissue select logic that selects said first reissue instruction when said first full signal is asserted, that selects said gated second reissue instruction when said first full signal is negated and when said second full signal is asserted, that selects said third reissue instruction from said reissue data path when said first and second full signals are both negated.

5. The reissue instruction parking system of claim 4, wherein said reissue parking logic further comprises:
   a primary register having an input coupling to said output of said gating reissue select logic and having an output providing said first reissue instruction to the reservation stations module.

6. The reissue instruction parking system of claim 1, wherein said at least one first pipeline stage further comprises:
   a primary register providing said first reissue instruction to the reservation stations module when said first full signal is negated, and holding said first reissue instruction from said reissue data path when said first full signal is asserted.

7. The reissue instruction parking system of claim 1, wherein said at least one second pipeline stage comprises:
   pointer hold register logic having an input coupled to said pointer selected by the reorder buffer and developing a hold pointer which is a latched version of said selected pointer, wherein said pointer hold register logic provides said selected pointer to the reorder buffer when said second full signal is negated, and provides said hold pointer to the reorder buffer when said second full signal is asserted.

8. The reissue instruction parking system of claim 1, wherein said reservation stations module incorporates multiple reservation stations queues, and if any one of said reservation stations queues is full, said first full signal is asserted.

9. A microprocessor, comprising:
   at least one execution unit;
   a reservations station module that dispatches instructions for execution by said at least one execution unit;
   a reorder buffer that reissues instructions to said reservation stations module during a reissue state; and
   a reissue instruction parking system, comprising:
      at least one first pipeline stage that provides a first reissue instruction from a reissue data path to the reservation stations module during the reissue state, and that parks said first reissue instruction when a first full signal is asserted, wherein said first full signal is asserted once the reservation stations module is determined to be full during the reissue state;
      at least one second pipeline stage that provides a pointer selected by the reorder buffer to the reorder buffer, in which the reorder buffer provides said first reissue instruction corresponding to said selected pointer onto said reissue data path, wherein said at least one second pipeline stage is placed into a hold state when a second full signal is asserted; and
      a reissue register having an input coupled to an output of said reorder buffer and having an output coupled to said reissue data path.

10. The microprocessor of claim 9, wherein said second full signal is a latched version of said first full signal.

11. The microprocessor of claim 9, wherein said at least one first pipeline stage further comprises:
    reissue parking logic that parks said first reissue instruction when said first full signal is asserted, that selects a gated second reissue instruction registered from said reissue data path when said first full signal is negated and when said second full signal is asserted, and that selects a third reissue instruction from said reissue data path when said first and second full signals are both negated.

12. The microprocessor of claim 11, wherein said reissue parking logic comprises:
    a gating register that holds a second reissue instruction from said reissue data path upon assertion of said first full signal and that outputs said gated second reissue instruction; and
    gating reissue select logic that selects said first reissue instruction when said first full signal is asserted, that selects said gated second reissue instruction when said first full signal is negated and when said second full signal is asserted, that selects said third reissue instruction from said reissue data path when said first and second full signals are both negated.

13. The microprocessor of claim 12, wherein said reissue parking logic further comprises:
    a primary register having an input coupling to said output of said gating reissue select logic and having an output providing said first reissue instruction to said reservation stations module.

14. The microprocessor of claim 9, wherein said at least one first pipeline stage further comprises:
    a primary register providing said first reissue instruction to the reservation stations module when said first full signal is negated, and holding said first reissue instruction from said reissue data path when said first full signal is asserted.

15. The microprocessor of claim 9, wherein said at least one second pipeline stage comprises:
    pointer hold register logic having an input coupled to said pointer selected by the reorder buffer and developing a hold pointer which is a latched version of said selected pointer, wherein said pointer hold register logic provides said selected pointer to the reorder buffer when said second full signal is negated, and provides said hold pointer to the reorder buffer when said second full signal is asserted.

16. A method of parking reissue instructions for a microprocessor, wherein the microprocessor includes a reservation stations module that dispatches instructions for execution and a reorder buffer that reissues instructions to the reservation stations module during a reissue state, said method comprising:
    providing a first reissue instruction from said reorder buffer to the reservation stations module;
    detecting a full condition of the reservation stations module and providing a first full signal;
    registering the first full signal and providing a second full signal;
    parking said first reissue instruction when the first full signal is asserted; and while the second full signal is asserted, holding a state of a pipeline associated with the reorder buffer that provides said first reissue instruction to the reservation stations module.

17. The method of claim 16, when the second full signal is negated, further comprising:
selecting a pointer by the reorder buffer and providing a first selected pointer;
registering the first selected pointer and providing a hold pointer; and
providing the first selected pointer to the reorder buffer which outputs said first reissue instruction.

18. The method of claim 16, when the second full signal is asserted, further comprising:
holding a first selected pointer selected by the reorder buffer and holding a hold pointer, wherein said hold pointer is a latched version of said first selected pointer; and
providing the hold pointer to the reorder buffer which outputs a third reissue instruction.

19. The method of claim 16, wherein said parking said first reissue instruction further comprises:
when the first full signal is asserted, selecting and maintaining said first reissue instruction;
when the first full signal is negated while the second full signal is still asserted, selecting a gated second reissue instruction registered from said reorder buffer; and
when the first and second full signals are both negated, selecting a third reissue instruction from the reorder buffer.

20. The method of claim 19, further comprising, when the first full signal is asserted while the second full signal is negated, registering a second reissue instruction from the reorder buffer into a gating register providing the gated second reissue instruction.

* * * * *